June 14, 1927.
L. SCHOMBOURGER
1,632,627
SPEED CONTROL SYSTEM
Filed Jan. 24, 1925
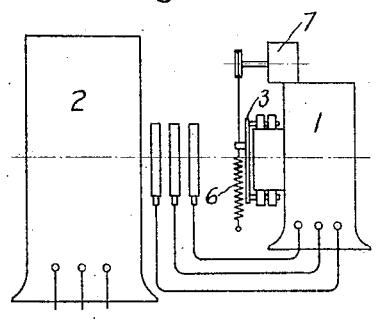
Fig.1.
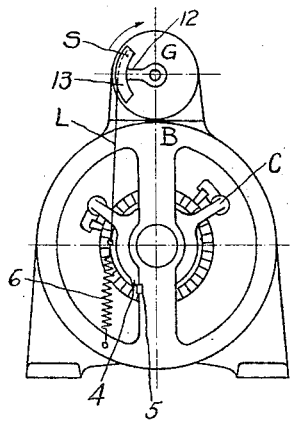
Fig.2.
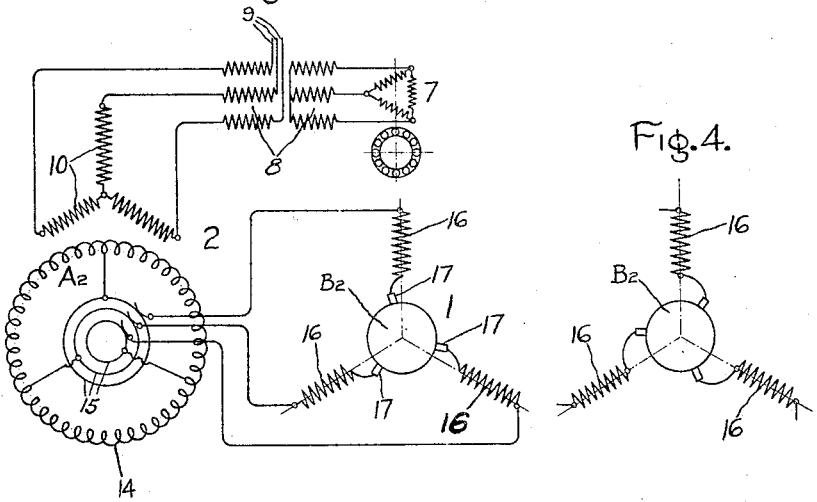
Fig.3.
Fig.4.
Inventor:
Lucien Schombourger,
by
His Attorney.

Patented June 14, 1927.

1,632,627

UNITED STATES PATENT OFFICE.

LUCIEN SCHOMBOURGER, OF PARIS, FRANCE, ASSIGNOR TO GENERAL ELECTRIC COMPANY, A CORPORATION OF NEW YORK.

SPEED-CONTROL SYSTEM.

Application filed January 24, 1925, Serial No. 4,597, and in France February 26, 1924.

My invention relates to systems wherein a regulating machine is concatenated with a main motor for the purpose of controlling its speed, and has for its object the provision of an improved means for causing the motor to operate with compound characteristics and for improving its power factor.

When induction motors are subjected to loads of variable magnitude, it is sometimes desirable that the kinetic energy of a flywheel be utilized to prevent excess variation in the value of the power supplied to the motor. In order to accomplish this result, it has been proposed to vary the secondary resistance of the motor in accordance with the motor load by means of a slip regulator or the like. This arrangement permits operation of the motor with compound characteristics but does not permit control of the power factor at which the motor is operated. It is of course possible to compound the main motor and to control its power factor to some extent by concatenating it with a regulating commutator machine having series characteristics; but this arrangement permits control of the power factor only when the motor is carrying a substantial load and has the disadvantage that it produces less efficient compounding than control of the secondary resistance by means of a slip regulator due to the fact that the degree or coefficient of compounding is changed by saturation of the regulating machine at heavy motor loads.

In accordance with my invention, these difficulties are avoided by the provision of a regulating machine which is arranged to have the position of its commutator brushes automatically changed in accordance with the magnitude of the motor load. In this manner, the phase and magnitude of the current transmitted between the main motor and the regulating machine are varied in a manner to produce proper compounding of the motor and proper control of the power factor at all motor loads.

My invention will be better understood from the following description when considered in connection with the accompanying drawing and its scope will be pointed out in the appended claims.

Referring to the drawing, Figs. 1 and 2 show different views of a speed control equipment in which my invention has been embodied; and Figs. 3 and 4 illustrate the connections of the apparatus shown by Figs. 1 and 2.

The drawing shows a regulating machine 1 which is concatenated with a main motor 2 and is arranged to have its brushes shifted around its commutator by means of a brush yoke 3, a projector 4 and a stop 5 being provided to limit the movement of the yoke in a counterclockwise direction. A spring 6 is arranged to bias the yoke 3 to a position where the projection 4 is in engagement with the stop 5. Suitable means, shown as comprising a slip regulator 7, are provided for moving the brush yoke 3 against the tension of the spring 6 as the load on the main motor increases.

As indicated by Fig. 3, the slip regulator 7 is arranged to be supplied with current through a current transformer 8 which has its primary winding connected in the leads 9 through which current is supplied to the primary winding 10 of the main motor 2. Suitable means, shown as a crank 12 and a sector shaped member 13, may be provided for transmitting movement between the brush yoke 3 and slip regulator 7. The secondary winding 14 of the main motor 2 is arranged to be interconnected with the armature winding of the regulating machine 1 through slip rings 15, series field windings 16 and brushes 17 of the regulating machine.

When the load of the motor 2 is small, the spring 6 tends to maintain the projection 4 in contact with the stop 5, thus displacing the brushes 17 in a counterclockwise direction relatively to the stator windings 16, as indicated by Fig. 3. With this position of the brushes, generator action of the regulating machine 1 is initiated by self excitation and magnetizing current is supplied therefrom to the main motor 2. The power factor of the main motor at light or no loads is thus improved. As the motor load increases, the slip regulator 7 operates to shift the brushes in a clockwise direction, as indicated by Fig. 4, thus gradually changing the phase of the current transmitted between the machines 1 and 2. As the brushes are moved around the commutator in a clockwise direction, a point is reached at which the regulating machine 1 begins to function in a well known manner as a motor by which the main motor 2 is caused to operate with compound characteristics and with a power factor which is subject to control.

The use of the slip regulator to control the brush position of the regulating machine 1 in accordance with the load of the main motor 2 has the very great advantages that it both makes it possible to control the power factor at light loads and renders the coefficient of compounding to a large extent independent of the degree to which the magnetic circuits of the regulating machine 1 are saturated.

The embodiments of the invention illustrated and described herein have been selected for the purpose of setting forth the principles involved. It will be apparent, however, that the invention is susceptible of being modified in many ways to meet the different conditions encountered in its use, and I therefore aim to cover by the appended claims all modifications within the true spirit and scope of my invention.

What I claim as new and desire to secure by Letters Patent of the United States, is:—

1. The method of controlling the speed and power factor of an induction motor cascaded with a series excited commutator regulating machine which consists in shifting the brushes of said regulating machine in accordance with the load on said motor in such manner that at light loads the position of the brushes of the regulating machine is such as to cause said machine to function as a generator to supply magnetizing current to the induction motor, and at heavy loads the position of the brushes of the regulating machine is such as to cause said machine to operate as a motor receiving energy from the secondary of said induction motor.

2. A speed control system comprising an induction motor and a commutator regulating machine having a main series field winding, said regulating machine being connected in cascade with the secondary of said induction motor, adjustable brushes on said commutator machine, means responsive to the load on said induction motor for shifting said brushes counter to the direction of rotation of said commutator machine in proportion to the load on said motor, and means for moving said brushes in the opposite direction when the load decreases, the angle of such brush shift extending both sides of a neutral position with respect to the series field windings with which the brushes are connected.

3. A speed control system comprising an induction motor provided with primary and secondary windings, a regulating machine including a commutated winding and a main series field winding, means for interconnecting said secondary and commutated windings through said series field winding, and means including a current transformer arranged to have its primary winding connected in series with the primary winding of said motor for adjusting the connections between said secondary and commutated windings.

In witness whereof, I have hereunto set my hand this 9th day of January, 1925.

LUCIEN SCHOMBOURGER.